Dec. 24, 1929.　　A. BRIESE ET AL　　1,740,495
DEVICE FOR CLOSING AND OPENING THE VISE JAWS OF AUTOMATIC SCREW MACHINES
Filed Dec. 14, 1928
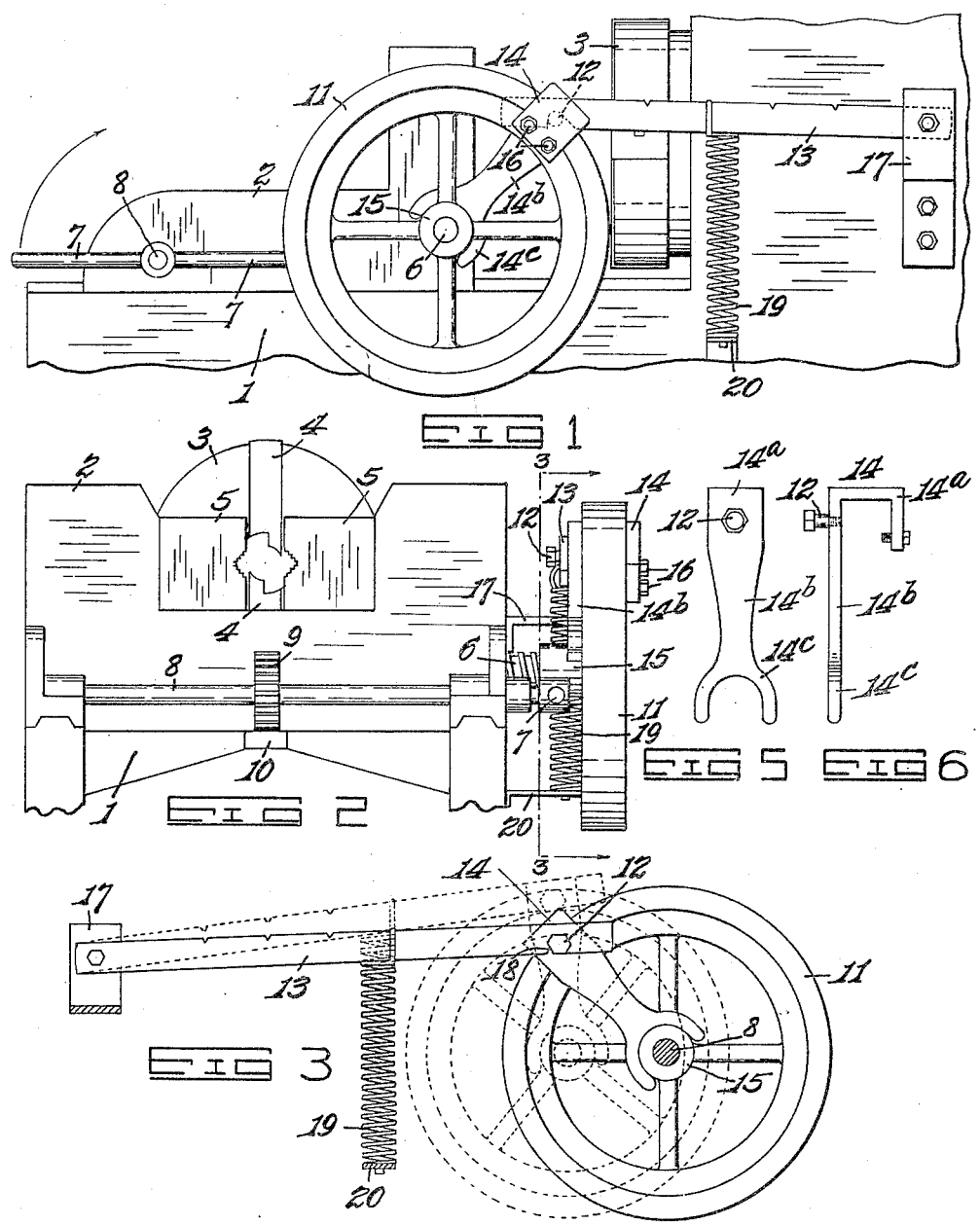

Patented Dec. 24, 1929

1,740,495

UNITED STATES PATENT OFFICE

ALFRED BRIESE AND RUSSELL CALLOW, OF WHEELING, WEST VIRGINIA, ASSIGNORS TO WHEELING MACHINE PRODUCTS COMPANY, OF WHEELING, WEST VIRGINIA, A CORPORATION OF WEST VIRGINIA

DEVICE FOR CLOSING AND OPENING THE VISE JAWS OF AUTOMATIC SCREW MACHINES

Application filed December 14, 1928. Serial No. 326,080.

This invention relates broadly to automatic screw machines, and more specifically to an automatic vise-closing and opening device for threading machines.

The primary object of the invention is to provide, in a thread cutting machine, or other form of cutting machine embodying vise jaws, a device whereby such jaws are closed and opened automatically as the movable carriage of the machine is advanced and retracted with respect to the operating tool.

In describing the invention in detail, reference is herein had to the acompanying drawings, in which—

Figure 1 is a partial side elevation of an automatic thread cutting machine embodying this invention;

Figure 2 is a front elevation of the same;

Figure 3 is a sectional elevation taken on line 3—3, Fig. 2;

Figure 4 is an enlarged side elevation of the wheel-rotating bar;

Figure 5 is a side elevation of the adjustable wheel-carried member, detached; and—

Figure 6 is an edge view of the same.

Referring to said drawings, 1 designates the bed and 2 the vise-bearing carriage of a machine of the general character commonly employed for performing various cutting and boring operations on rods and tubes, as for cutting threads and the like.

The reference character 3 designates a continuously rotating die head which is self-releasing and which, as herein shown, carries chasers 4 relative to which the rod, tube, or other character of work-piece held by the vise jaws 5 borne by the carriage 2 is advanced and retracted. Mechanism including a worm shaft 6 is ordinarily employed for actuating the vise jaws into and out of gripping relation to the work piece, such worm shaft being carried by and movable with the carriage 2 which is advanced and retracted by hand power applied through a lever or levers 7 fixed upon an end of a suitably journaled shaft 8 which carries a pinion 9 that is operatively engaged with a stationary rack bar 10 mounted upon the bed 1.

Heretofore, the worm shaft 6 has been actuated by hand power to rotate forward and back, such power usually being applied through a suitable form of hand wheel fixed upon the outer end of said worm shaft. The present invention is directed to a mechanism whereby the worm shaft is rotated forward and back automatically with the advancing and retracting movements of the carriage, thereby to dispense with such hand rotation; and it comprises a wheel 11 fixed on the outer end of the worm shaft, a crank arm or wrist pin 12 carried in rigid relation to a peripheral portion of said wheel, and a pivoted bar 13 arranged to cooperate with said wheel through the intermediacy of said wrist pin.

The wrist pin 12 may be fixed on and project laterally from the wheel 11 itself, but it is preferred that such pin be carried by a clamp 14 which may be adjusted to any desired position on the periphery of said wheel to accommodate different distances of rotary travel required of the latter to effect opening and closing of the vise jaws, as will hereinafter be explained. Said clamp, in the preferred form shown in the drawings comprises a head 14$^a$ of inverted U-shape adapted to more or less closely embrace the rim of the wheel 11, and an arm 14$^b$ formed integral and alined with the inner of the parallel members of said head. Said arm has at its end a yoke terminal 14$^c$ shaped to seat firmly upon the hub 15 of the wheel. Said arm not only functions firmly to support the clamp, but also as a centering means whereon the clamp may be rotated relative to the wheel for purposes of adjustment. Suitable attaching means is employed for securing the clamp in adjusted position, the means shown consisting of two set screws 16 directed through the outer parallel member of the head 14$^a$ into seated binding engagement with the adjacent face of the wheel 11.

The bar 13, which normally occupies a substantially horizontal position, has its forward end pivotally mounted on a bracket 17 or other suitable support carried in a suitable location, as on a side of the machine frame or housing. Provided in the under side of the rear end of said bar is a recess 18 designed for the reception of the wrist pin 12. A retractile coil spring 19 has its upper end attached to the bar 13 and has its lower end suitably attached to a fixed member, as to a bracket 20 mounted on the machine housing. Said spring tends normally to maintain the free rear end of the bar 13 seated with respect to the wrist pin 12.

With the carriage 2 occupying its fully retracted position and with the wheel 11 occupying a position wherein the vise-jaws 5 are opened to the extent desired for introduction between the latter of the work-pieces which are to be acted upon, the clamp 14 is preliminarily adjusted upon the rim of said wheel to locate the wrist-pin 12 in the position wherein it is received within the recess 18 of the bar 13 when the latter occupies its fully lowered position, as is clearly shown in Figs. 1, 2 and 3. Manifestly, work requiring movements of the carriage throughout any different distance, or requiring a different relative positioning of the vise-jaws will necessitate the adjustment of the clamp to a different position on the rim of the wheel.

In practice, the work-piece is first introduced between the vise-jaws 5, following which the operator advances the carriage 2 over the bed 1 by rotating the pinion-carrying shaft 8, effected by hand power applied to the lever or levers 7 for turning the latter in the direction indicated by the arrow in Fig. 1. As said carriage is advanced, the wheel 11 carried thereby is actuated, through the intermediacy of the relatively fixed wrist pin 12 engaged in the recess 18 of the bar 13, to rotate in a rearward direction, whereby the worm shaft 6 is rotated for effecting closing of the vise-jaws upon said work-piece. When said jaws have thus become closed upon the work-piece, as at the position shown in broken lines in Fig. 3, further rearward rotation of the wheel is positively prevented and, consequently, the continued advance of the carriage for presenting said work-piece to the action of the tool or tools carried by the die-head 3 requires that the bar 13 become disengaged from force-exerting relation to the wrist-pin. Such disengagement is effected automatically, the carriage advancing force being sufficient to cause the inclined rear defining-wall of the recess 18 to ride upwardly over said wrist pin, elevating the bar against the tension of its spring 19 to a position in which said wrist pin may freely ride on the under side of said bar during the remainder of the advance movement of the carriage.

As the carriage and the thereby-carried wheel 11 are retracted, the wrist pin rides on the under side of the bar 13 until the recess 18 is reached, whereupon it enters said recess. Continued retraction of the carriage results in the wheel being rotated in a forward direction through the intermediacy of the interengaged bar and wrist-pin, whereby the vise-jaws are reopened for releasing the work-piece.

It will be understood that the automatic screw machine herein disclosed is merely typical of mechanisms of the character to which the invention is applicable.

As is obvious, the wheel 11 herein shown and described might be replaced by a wheel segment in cases where the required extent of rotary travel is less than 360°; or, a crank arm adapted to be adjusted to various positions on the worm shaft and carrying a wrist-pin obviously might be substituted for said wheel. It will therefore be understood that the term "wheel", as used in the appended claims, is intended, where the context so admits, to include a wheel segment, crank arm, or other equivalent shaft rotating device.

What is claimed is—

1. In a machine of the character described, the combination with a reciprocable carriage having work-holding jaws mounted thereon, of rotary means for opening and closing said jaws, said means including a transverse shaft journaled on said carriage, a wheel fixed on said shaft, a wrist-pin mounted on said wheel, a pivoted member having therein a recess in which said wrist-pin is engageable, and tension means tending to maintain said member in engaged relation to said wrist pin.

2. In a machine of the character described, the combination with a reciprocable carriage having work-holding jaws mounted thereon, of rotary means for opening and closing said jaws during reciprocating movements of said carriage, said means including a transverse shaft journaled on said carriage, a wheel fixed on said shaft, a wrist-pin mounted on said wheel, and means normally engaged with said wrist-pin whereby said wheel is actuated to rotate during the advance and return movements of said carriage for effecting closing and opening respectively, of said jaws.

3. In a machine of the character described, the combination with a reciprocable carriage having work-holding jaws mounted thereon, of rotary means for opening and closing said jaws during reciprocating movements of said carriage, said means including a transverse shaft journaled on said carriage, a wheel fixed on said shaft, a wrist-pin mounted on said wheel, a member having an end pivotally mounted at a point in advance of the path of travel of said wheel and having in its opposite end a recess in which said wrist pin is engageable, and a tension device whereby said member is maintained yieldingly in seated relation to said wrist-pin, said member having said wrist-pin engaged with the recess during a portion of the advance movement of the carriage, whereby said wheel is rotated to effect closing of said jaws, and being adapted to release said wrist-pin for permitting continued advance of the carriage following such closing of the jaws, said member also being adapted in the return movement of the carriage to reengage said wrist-pin and to retain engagement with the latter during the final portion of such movement for actuating jaw-reopening return rotation of said wheel.

5. In a machine of the character described, the combination with a reciprocable carriage having work-holding jaws mounted thereon, of rotary means for opening and closing said jaws during reciprocating movements of said carriage, said means including a transverse shaft journaled on said carriage, a wheel fixed on said shaft, a wrist-pin mounted on said wheel, a pivoted bar having therein a recess normally engaged with said wrist-pin whereby, in the advance and return movements of said carriage, said wheel is actuated to rotate backward and forward, respectively, for effecting closing and opening of said jaws.

5. In a machine of the character described, the combination with a reciprocable carriage having work-holding jaws mounted thereon, of rotary means for opening and closing said jaws during reciprocating movements of said carriage, said means including a transverse shaft journaled on said carriage, a wheel fixed on said shaft, a wrist-pin mounted on said wheel, a pivoted bar having therein a recess normally engaged with said wrist-pin whereby, in the advance and return movements of said carriage, said wheel is actuated to rotate backward and forward, respectively, for effecting closing and opening of said jaws, said bar being adapted to release said wrist-pin to permit continued advance movement of the carriage following the jaw-closing rotation of said wheel to reengage said wrist-pin at an intermediate point in the return movement of the carriage, and to retain such engagement to the end of said return movement for actuating jaw-reopening return movement of said wheel.

6. In a machine of the character described, the combination with a reciprocable carriage having work-holding jaws mounted thereon, of rotary means for opening and closing said jaws during reciprocating movements of said carriage, said means including a transverse shaft journaled on said carriage, a wheel fixed on said shaft, a wrist-pin mounted upon said wheel, and a pivoted member normally cooperating with said wrist-pin to actuate rotary movements of the carriage for effecting closing and opening movements, respectively, of said jaws, and tension means associated with said member adapted to permit the latter to free itself from and to actuate said member to resume cooperative relation with said wrist-pin at definite points in the advance and return movements of the carriage.

7. In a machine of the character described, the combination with a reciprocable carriage having work-holding jaws mounted thereon, of rotary means for opening and closing said jaws during reciprocating movements of said carriage, said means including a transverse shaft journaled on said carriage, a wheel fixed on said shaft, a wrist pin, carrying means for said wrist pin adjustable to various positions upon said wheel, a pivoted member, and tension means adapted normally to maintain said member in cooperative engaged relation to said wrist pin whereby, in advance and return movements of the carriage, said wheel is rotated rearward and forward, respectively, for effecting closing and opening movements of said jaws, said tension means being adapted to permit said member to free itself from such relation to the wrist pin at the end of the jaw closing rotary movement of said wheel and to actuate said member to resume such relation at a definite point in the return movement of said carriage.

In testimony whereof we affix our signatures.

ALFRED BRIESE.
RUSSELL CALLOW.